E. HEYDON.
TROLLEY SWITCH PLATE.
APPLICATION FILED FEB. 13, 1909.

935,304.

Patented Sept. 28, 1909.

Witnesses
Frank A. Fahle

Inventor
Edward Heydon,
By Bradford Hood
Attorneys

UNITED STATES PATENT OFFICE.

EDWARD HEYDON, OF INDIANAPOLIS, INDIANA.

TROLLEY SWITCH-PLATE.

935,304.

Specification of Letters Patent. Patented Sept. 28, 1909.

Application filed February 12, 1909. Serial No. 477,604.

*To all whom it may concern:*

Be it known that I, EDWARD HEYDON, a citizen of the United States, residing at Indianapolis, in the county of Marion and State of Indiana, have invented certain new and useful Improvements in Trolley-Switch-Plates, of which the following is a specification.

In the operation of interurban passenger and freight railways where a current is transmitted to the motor through the medium of an under running trolley, difficulty is experienced at sidings because, with the construction now commonly in use, the trolley wire for the siding is not connected to the main wire but, instead, is arranged to one side of the main trolley wire and, when the car takes the siding, it is necessary for the conductor to pull the trolley wheel down away from the main trolley wire and shift it over into engagement with the siding trolley wire, during which time the car is in darkness. The running time of cars upon interurban roads is very closely gaged and it often occurs that one car has barely time to make a siding before the oppositely moving car reaches the siding and, where, owing to difficulty in replacing the trolley upon the siding wire, the car taking the siding has been left in darkness and stationary, with its rear end partly extending back upon the main line and the oncoming car has run into the car taking the siding with serious results.

It has heretofore been proposed, I am aware, to provide a permanent switch connection between the main trolley wire and the siding wire and connect the switching mechanism therein with mechanism commonly used for throwing the switch members of the track at the siding but, so far as I am aware all such mechanisms heretofore proposed have been open to the serious objection that, in actual use under varying weather conditions, they soon become inoperative or are so formed that, while possibly being operable when the cars move at comparatively slow speeds, they are of such character that cars moving along the main line at normally maintained speeds of from 40 to 60 miles per hour, operate upon the under running trolley to displace it from the trolley wire.

The object of my present invention is therefore to produce a thoroughly practical and commercial trolley wire switch so formed as to its details of construction that it cannot become weather clogged, and so that the under running trolley will be presented to the main body of the switch in such a way that, even at very high speeds, it will not be displaced from the trolley wire.

The accompanying drawings illustrate my invention.

Figure 1:
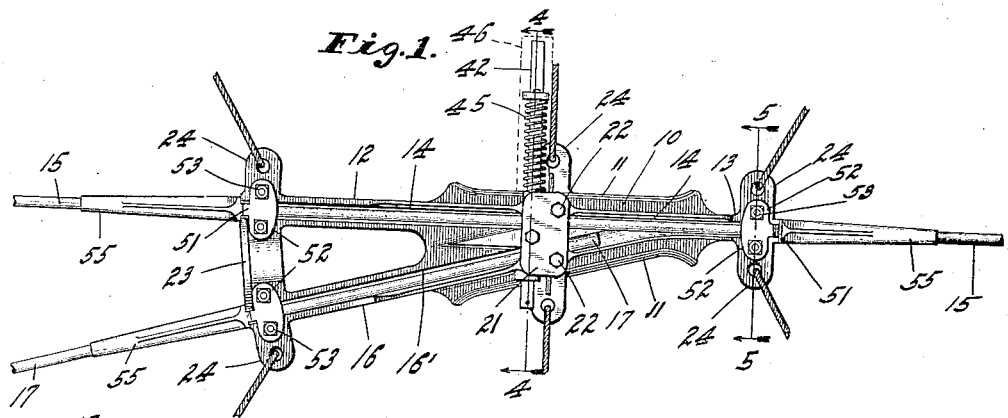
Figure 2:
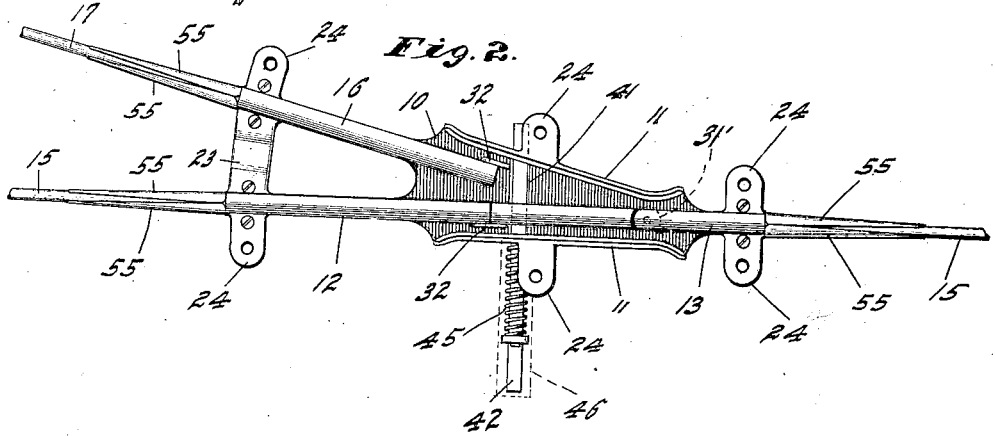
Figure 3:
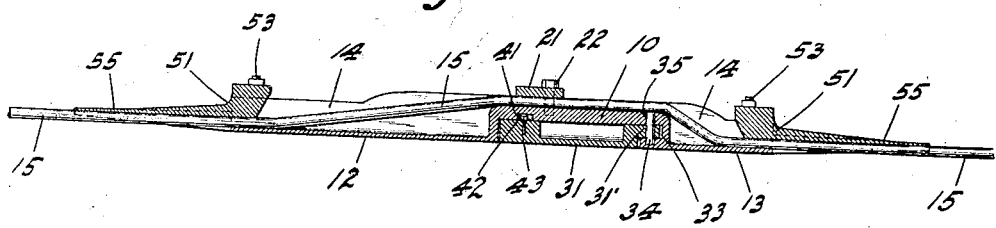
Figure 5:
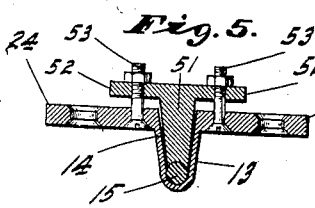
Figure 4:
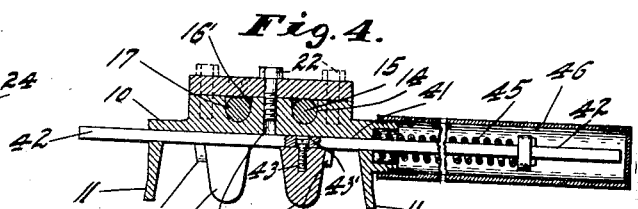

Figure 1 is a top plan of a switch embodying my invention; Fig. 2 an under plan; Fig. 3 a vertical section along the line of the main trolley wire; Fig. 4 a transverse section on line 4—4 of Fig. 1, and Fig. 5 a section on line 5—5 of Fig. 1.

In the drawings 10 indicates the main body or plate of the device flanked at each side by downwardly projecting flanges, 11, 11 which are properly spaced from the guide members to receive the flanges of standard trolley wheel. Formed at opposite ends of plate 10, and projecting downwardly from the lower face thereof and preferably integrally therewith are two alined guide members 12 and 13, which, in their tops are provided with channels 14 through which the trolley wire 15 may be carried continuously and without break. Also depending from the under face of one end of plate 10, and lying at an angle to members 12 and 13 and a distance therefrom, at its nearest point somewhat in excess of the thickness of the flange of the trolley wheel, is a siding guide member 16 which, in its top, is provided with a wire channel 16' in which the siding wire 17 may be seated and clamped.

In order to clamp the main trolley wire and the siding wire firmly to the main body, I provide a clamping plate 21 held down upon the adjacent portions of the main trolley wire and the siding wire by means of suitable clamping screws 22. The divergent ends of the two guide members 12 and 16 are connected by a cross member 23 and perforated ears 24 are provided at various points as indicated, in order that the structure may be supported adequately by the usual guy wires.

The inner ends of guides 12 and 13 are separated and the space between these ends is bridged by a switch tongue 31 which is adapted to be thrown from its normal position of alinement between members 12 and 13 to a position connecting members 13 and 16, suitable stop fingers 32 being provided in order to limit possible throw of the tongue and thus insure its proper positioning relative to the members 12 and 16. The tongue 31 lies upon the under face of plate 10 and is thoroughly protected from the weather by flanges 11 but, in order that this switch tongue may be operated by a mechanism cheap to manufacture, yet of such character as to be weather proof, I have adopted the following construction. Tongue 31 at its pivotal end, is provided with a tip 31' of about half the vertical depth of the tongue which tip passes into a pocket 33 formed between plate 10 and an overhanging or extending portion of guide 13. A pivot 34 is dropped into an opening 35 formed in the upper part of plate 10 in the bottom of groove 14, and extends into suitably formed passages in tip 31' and the adjacent portion of guide 13, the arrangement being such that pin 34 is held in place, although it may be loosely inserted, because the main trolley wire will lie upon its upper end.

Formed in the under face of plate 10 above the top of tongue 31, is a groove 41 which extends transversely across the space between flanges 11 and out through said flanges. Mounted in groove 41 is a shifting rod 42 which is connected to tongue 31 by means of a pin 43 passed through hole 42 and threaded into the tongue 31. In order that pin 43 may not be accidentally jarred out of place I prefer to so proportion the parts that this pin can only be inserted into the shifting bar through an opening 44 which is threaded to receive one of the clamping screws 22. Surrounding the operating bar 42 and continually urging it in such direction as to cause tongue 31 to normally lie in alinement between guide members 12 and 13, is a spring 45 and, in order that this spring may be protected from the weather I inclose the same in a tube 46 secured to the main body 10. The operating bar 42 is adapted to be connected, by any suitable connection with the switch stand at the siding so that, when the track switch is open in order to permit a car to take the siding the tongue 31 will be thrown into position to connect the main line with the siding wire but, as soon as the track switch is thrown back to normally closed position in order to permit another car to proceed upon the main line, tongue 31 will be automatically returned to its normal position by means of spring 45. It is very necessary in an apparatus of this kind not only that the trolley wheel may proceed over the apparatus at a high rate of speed without liability of displacement, but also that the apparatus be of such character that it be readily removed, for replacement and repair without dismantling or disconnecting the general overhead construction in such way as to delay passing cars. In order to accomplish this result therefore, I have provided trolley-wire receiving fingers for the outer end of each of the guides 12, 13 and 16. Each of these fingers comprises a main body 51 which is flanked by a pair of oppositely extending perforated ears 52, the main body 51 being adapted to fit down into a channel 14 and be held in place by means of bolts 53 passing through the ears 52 and ears 24 of the main body 10. Each finger 51 comprises a pair of separated flanges 55, 55 which form between them a semicylindrical socket adapted to receive the trolley wire and these flanges are decreased in vertical height toward the extremity of the finger so that, when a wire has been placed between the flanges, said flanges may be hammered down around the wire, and also so as to form a gradual approach for the trolley wheel to the extremity of the guide 12, 13 or 16, thus preventing any injurious arcing at these points. It will be immediately apparent that, if any trouble occurs with the mechanism, the main plate 10, together with the parts carried immediately thereby, may be readily removed from the trolley wires without disturbing said wires by detaching the fingers 51 from the guides 12, 13 and 16 and by detaching the guy wires from the ears 24, thus permitting plate 10 to drop down away from the remaining structure.

It will be noticed that the movable parts of the switch plate are thoroughly protected from the weather so that they cannot become frozen up by sleet. It will also be noticed that the structure is one which may be readily and cheaply cast and assembled.

I claim as my invention:—

1. A trolley switch plate comprising a main plate having a wire guide at one end, a pair of diverging wire guides at the other end said wire guides having the trolley-wire receiving channels formed in their upper surfaces, means for attaching trolley wires to the outer ends of said guides, a switch tongue pivotally mounted on said plate at the inner end of the single guide and adapted to be laterally thrown into conjunction with the inner ends of the pair of diverging guides, means for shifting said switch tongue, a wire-receiving finger having a main body adapted to fit in the outer end of the groove in the upper face of each guide and provided with a pair of outwardly decreasing flanges adapted to embrace the trolley wire, and means for detachably clamping said fingers to said guides.

2. A trolley-wire switch plate, comprising a main body, a pair of alined guide members carried by the under face of said main body and having their inner ends separated a pivoted switch tongue arranged to bridge the space between said guides said switch tongue being pivotally connected to one of the guide members by an overlapping portion and a pivot pin dropped therethrough from the upper side of the plate, a diverging guide carried by the main plate at one end thereof and arranged to coöperate with the switch tongue in one of its positions, means for detachably connecting a siding wire to said diverging guide, and means for detachably connecting the main structure to a continuous main line trolley wire, whereby the main body of the switch plate may be readily removed from the trolley wires without throwing the same out of commission.

3. The combination with the main body of a trolley-wire switch plate having a wire-receiving groove therein, of a wire-receiving finger provided with a pair of wire embracing flanges decreasing in depth from a dimension sufficient to substantially embrace a trolley wire to a dimension materially less than sufficient to embrace a trolley wire, whereby a gradual approach from trolley wire to switch plate may be produced, and means for fastening the switch plate to the trolley wire and for fastening the wire-receiving finger to the switch plate.

4. A trolley-wire switch plate, comprising a main body having a transverse groove formed in its under face, a bar slidably mounted in said groove, a pivoted switch tongue mounted upon the under face of the main body and extending over the sliding bar, an operating connection between the said sliding bar and the switch tongue, a rib carried by the under face of the main body and associated with the pivoted end of the tongue, a pair of separated diverging ribs carried by the under face of the main body in position to coöperate with the free end of the switch tongue, and a spring acting upon the sliding bar to normally urge the same in one direction.

5. A trolley-wire switch plate, comprising a main body having a transverse groove formed in its under face, a bar slidably mounted in said groove, a pivoted switch tongue mounted upon the under face of the main body and extending over the sliding bar, an operating connection between the said sliding bar and the switch tongue, a rib carried by the under face of the main body and associated with the pivoted end of the tongue, a pair of separated diverging ribs carried by the under face of the main body in position to coöperate with the free end of the switch tongue, a spring acting upon the sliding bar to normally urge the same in one direction and a housing carried by the main body and inclosing said spring and adjacent projected end of the sliding bar.

In witness whereof, I have hereunto set my hand and seal at Indianapolis, Indiana, this 8th day of February, A. D. one thousand nine hundred and nine.

EDWARD HEYDON. [L. S.]

Witnesses:
 ARTHUR M. HOOD,
 THOMAS W. McMEANS.